Figure 1:
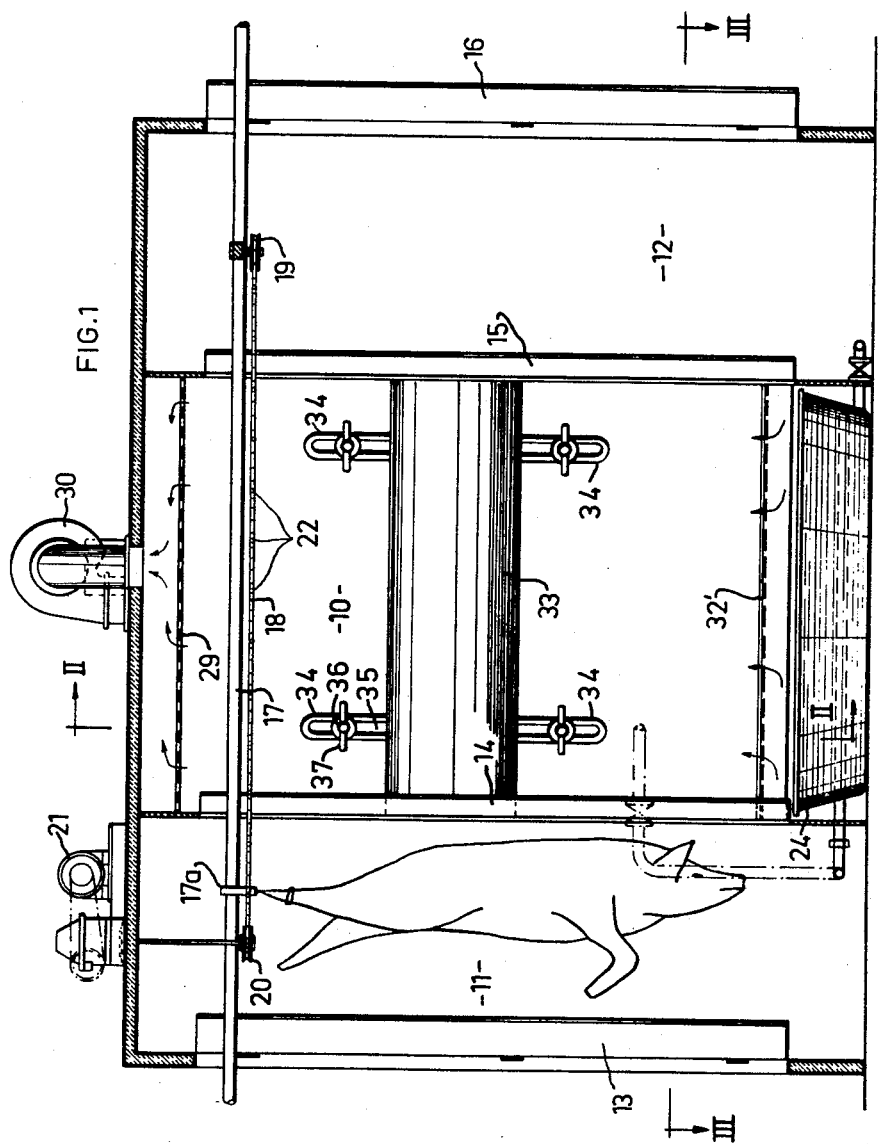

June 2, 1964 M. R. EKSTAM ETAL 3,135,016
SYSTEMS FOR SCALDING SLAUGHTERED ANIMALS
Filed Jan. 2, 1962 3 Sheets-Sheet 1

MARTIN R. EKSTAM AND
KARL G.E. JOHANSSON
INVENTORS
BY Wenderoth, Lind and Ponack
ATTORNEYS

MARTIN R. EKSTAM AND
KARL G.E. JOHANSSON
INVENTORS
ATTORNEYS

3,135,016
SYSTEMS FOR SCALDING SLAUGHTERED ANIMALS
Martin Rudolf Ekstam, Fjälkestad, and Karl Gunnar Ernfrid Johansson, Simrishamn, Sweden, assignors to AB Simrishamns Gjuteri, Simrishamn, Sweden, a corporation of Sweden
Filed Jan. 2, 1962, Ser. No. 163,522
Claims priority, application Sweden Jan. 3, 1961
8 Claims. (Cl. 17—15)

The process hitherto used for scalding slaughtered animals consists in placing the carcass in an open vat containing hot water; this rather primitive process is applied even in the industrialized slaughter of pigs. The process, however, is unsuitable for many reasons. The heat losses from the large open scalding vats naturally are high, and the water becomes heavily contaminated already when but a few carcasses have been scalded. The contaminated water penetrates through the openings in the head and particularly into the lungs, heart and liver and even into the trunk musculature of the animal, and as a consequence these parts cannot possibly be used as human food; the lungs are used in certain quarters for preparing cured meat, and the destruction of the lungs therefore implies an economical loss. It has been tried to overcome this latter disadvantage by inserting a wooden plug in the throat of the animal before the carcass is placed in the scalding vat but this is not entirely efficient for preventing a contamination of the lungs and moreover necessitates an additional operation. A further drawback of the scalding effected in vats is that the process is not continuous, i.e. the carcasses cannot very well be moved by means of an overhead conveyor through the scalding vat but have to be placed in, and removed from, the scalding vat by hand.

The present invention aims at eliminating the above disadvantages and is concerned with a system for scalding slaughtered animals comprising means forming a heat-insulated treatment chamber, means for continuously conveying hanging carcasses through the chamber from one end thereof to the other, means for supplying wet steam to the treatment chamber at the lower end thereof, means for withdrawing steam from the treatment chamber at the upper end thereof, and ducting means for returning the withdrawn steam to the treatment chamber at the lower end thereof. As the carcass is not submerged in a water bath in this system but is only contacted by the steam present in the chamber, there is no risk that the entrails of the carcass will be contaminated. Besides, the treatment is continuous in that the carcasses are successively conveyed through the chamber.

Figure 2:
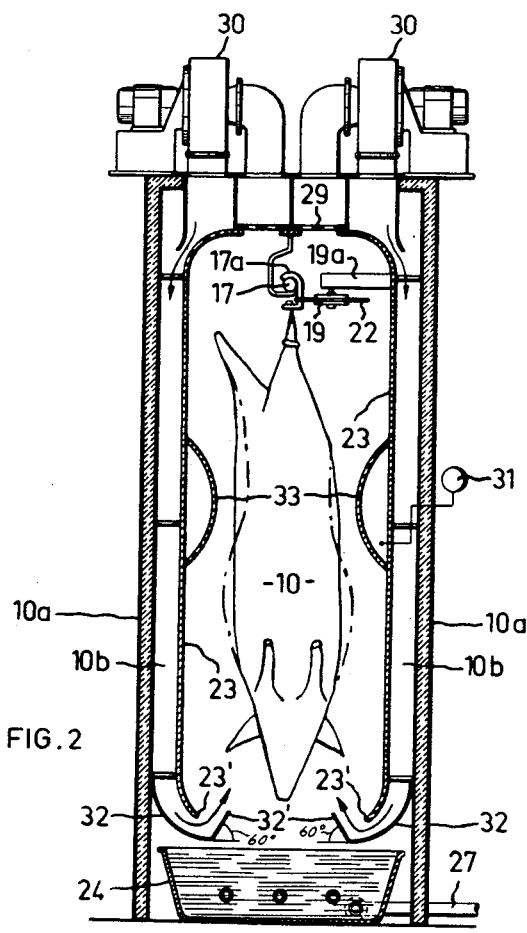
Figure 3:
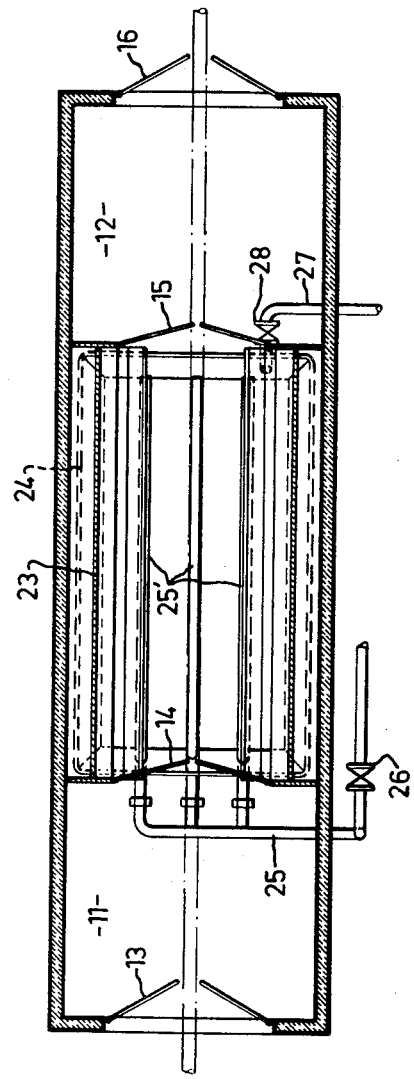

For a better understanding of the invention will be described in more detail in the following, reference being had to the example illustrated in the accompanying drawings, in which:

FIG. 1 is a longitudinal sectional view of the system;
FIG. 2 is a vertical sectional view on line II—II in FIG. 1;
FIG. 3 is a horizontal sectional view on line III—III in FIG. 1.

The system illustrated in the drawings includes a heat-insulated treatment chamber 10 with lock chambers 11 and 12 which are also heat-insulated and of which lock chamber 11 constitutes the input lock chamber and is provided with swinging doors 13 and 14, while lock chamber 12 constitutes the output lock chamber and is provided with swinging doors 15 and 16. An overhead conveyor 17 with trolleys 17a extends continuously through the three chambers. The swinging doors are spring-biased to closed position but are adapted to be moved aside against the spring bias by a carcass conveyed by the overhead conveyor 17. This overhead conveyor can connect up to overhead conveyors outside the system and the connecting overhead conveyors are preferaly inclined downwards to lock chamber 11 and downwards from lock chamber 12 so that the carcasses depending from the overhead conveyor move by gravity into and out of the system. In the interior of the chamber 10, however, the conveyance is positive, and for this purpose there is provided an endless chain conveyor 18. This chain conveyor runs over sprocket wheels 19 and 20, the sprocket wheel 19 being rotatably mounted on a bracket 19a while the other sprocket wheel 20 is supported and driven by an electric motor 21 with infinitely variable speed transmission so that the speed of the chain conveyor is easily adjusted. Projecting from the chain conveyor are dogs 22 which reach into the path of movement of the trolleys 17a of the overhead conveyor 17 so that said trolleys are positively taken along in the movement of the chain conveyor.

Mounted on the inner side of spaced outer longitudinal heat-insulated walls 10a of the treatment chamber 10 are inner wall members or baffles 23 which are spaced from the outer walls 10a to form passages 10b between the heat-insulated walls and said baffles and which are spaced from each other to define the interior of the treatment chamber. The baffles terminate at a considerable distance from the floor of the treatment chamber so that the passages 10b communicate at their lower margins with the interior of the treatment chamber 10. On the floor of the treatment chamber beneath the lower edges 23' of the baffles 23 which are bent towards the interior of the chamber, there is placed an upwardly open water vat 24 and extending into this vat is a conduit 25 which is connected to a steam generator (not shown) and which in three branches 25' passing along and at a distance above the bottom of the vat has a number of outlet openings which are directed towards the bottom. A motor valve 26 controlled by a thermostat is arranged in the conduit 25. The vat has an outlet 27 with a float operated valve 28 which is adjusted in such a way as to keep the water level in said vat well above the steam conduit 25.

A perforated metal sheet 39 is disposed as a ceiling in the upper section of the treatment chamber between the two baffles 23, and a pair of fans 30, driven by electric motors, have their suction sides separately connected through said perforated metal sheet 29 to the interior of the treatment chamber while the pressure sides of the fans are each connected to one of the passages 10b.

A vane 32 is disposed at the lower end of each passage 10b. Said vane gently conforms to the insulated side wall 10a of the treatment chamber and extends along and past the inwardly bent lower end 23' of the baffle 23 into the treatment chamber 10 and has the freely projecting end portion 32' of the vane angularly bent in an upward direction approximately at an angle of 60° to the horizontal plane to form with the lower end 23' of the baffle 23 a return outlet directed upwardly toward the upper end of chamber 10.

The treatment chamber thus contains two circulation systems each of which extends from the pressure side of either fan through either passage 10b to the lower end of the treatment chamber, upwards through the interior of the treatment chamber and back to the fan on the suction side thereof. The circulation has been indicated by arrows in the drawings.

When the system is in operation the vat 24 is filled with water up to the level determined by the float-operated valve 28 and steam is introduced into the vat through the steam conduit 25. Wet steam rises from the vat through the interior of the treatment chamber 10 and partly condenses on the carcasses conveyed through the treatment chamber by the overhead conveyor 17. Steam is sucked out of the treatment chamber at the upper end thereof by means of the fans 30 in order to be supplied again to said chamber at the lower end thereof simultaneously as steam is continuously supplied from the vat to replace the steam condensing into water. The vanes 32 deflect the steam returned through passages 10b in an upward direction to the space between the baffles 23 and the carcasses hanging in the treatment chamber 10 so that the newly supplied hot steam rising from the vat 24 will directly hit the head of the animal, which is a part difficult to scald, without being diluted by the returned colder steam. The speed of the chain conveyor 18 is so chosen that the time of stay of the carcasses in the treatment chamber will be sufficiently long to soften the epidermis of the carcasses to the extent required for the subsequent scraping. It may be mentioned as an example that a time of stay of 8 to 9 minutes is suitable for treating pig carcasses at a temperature in the treatment chamber of between 65 and 70° C. Condensed water forming in the treatment chamber flows or drips into the vat 24 but the water level therein is held constant by water being discharged from the vat through the outlet 27, to the extent this is required, by the float-operated valve 28. The temperature in the treatment chamber is controlled by adjustment of the steam supply by means of the motor valve 26 which may be connected to a temperature-indicating thermostat 31 the sensitive element of which is located in the treatment chamber.

In the area of the haunches of the hanging carcasses each baffle 23 has a vertically curved bulge 33. This bulge in the example shown is a metal sheet secured to the baffle 23 and extending throughout the length of the treatment chamber 10. Thanks to this bulge the baffle approximately conforms to the shape of the hanging carcasses when the latter are so large (e.g. pig carcasses weighing 100 kg. and more) that hanging with head downwards they have a pronounced waist because the entrails of the animals sink towards the diaphragm, widening the lower portion of the carcass over the thorax while the carcass is considerably contracted over the haunches (the shape of the carcass in this case is indicated by dash lines in FIG. 2) so that the spaces between the baffles 23 and the hanging carcasses do not undergo any more extensive variations in the cross sectional area in an upward direction, whereby the steam flows substantially at constant speed through these spaces, which is necessary to attain a uniform scalding action. The bulges 33 are adjustable vertically relative to the baffles 23 and can be removed from said baffles to permit adaptation of their position to the carcasses to be treated, or replacing them by bulges of other sizes and/or shapes. The bulges are therefore provided with projecting lugs 34 having slots 35 therein, by means of which they are passed over projecting bolts 36 on the baffles 23. They are held to the bolts by wing nuts 37. By loosening wing nuts 37 on bolts 36 it is possible to slide lugs 34 on bolts 36 longitudinally of slots 35 thereby to adjust bulges 33 vertically relative to baffles 23. When retightening nuts 37 the bulges are fixedly secured in their adjusted position.

The capacity of the system is obviously limited by the fact that the system cannot handle more carcasses per unit of time than those which pass through the treatment chamber 10 in the time determined by the conveyor 18. The capacity can be increased by an increase of the speed of the conveyor but in such a case also the length of the treatment chamber has to be increased.

What we claim and desire to secure by Letters Patent is:

1. A system for scalding slaughtered animals, comprising a heat-insulated treatment chamber having spaced outer longitudinal walls and inner wall members spaced from said outer longitudinal walls to form passages between the said outer walls and said inner wall members, said inner wall members being spaced from each other to define an interior of said treatment chamber, means in the interior of said treatment chamber for continuously conveying hanging carcasses through the interior of said chamber from one end thereof to the other, means for supplying wet steam to the lower end of the interior of said treatment chamber, suction means at the upper end of said treatment chamber for withdrawing steam from the interior of the treatment chamber and delivering it into the passages between the spaced outer walls and inner wall members, said passages returning the withdrawn steam to the interior of the treatment chamber at the lower end thereof.

2. A system as claimed in claim 1, in which said passages for returning the withdrawn steam to the lower end of the treatment chamber at the lower end of said treatment chamber have a return outlet directed upward toward the upper end of the treatment chamber.

3. A system for scalding slaughtered animals comprising means forming a heat-insulated treatment chamber, means for continuously conveying hanging carcasses through the chamber from one end thereof to the other end, means for supplying wet steam to the treatment chamber at the lower end thereof, means for withdrawing steam from the treatment chamber at the upper end thereof, ducting means for returning the withdrawn steam to the treatment chamber at the lower end thereof, and a vane at the lower end of the treatment chamber for deflecting the returned steam in an upward direction when it flows into the treatment chamber.

4. A system as claimed in claim 3, in which the vane has a projecting end portion extending in an upward direction at an angle to the horizontal.

5. A system as claimed in claim 4, in which the upwardly extending end portion makes an angle of substantially 60° with the horizontal plane.

6. A system as claimed in claim 1, further comprising a vertically curving bulge on each of the walls extending in the conveying direction, said bulge extending throughout at least the greater part of the length of said walls, while the remaining wall portions are substantially plane.

7. A system as claimed in claim 6, further comprising means mounting said bulges on said walls with adjustability in vertical direction.

8. A system for scalding slaughtered animals comprising means forming a heat-insulated treatment chamber, said means comprising walls extending in the conveying direction and forming hollow spaces, means for continuously conveying hanging carcasses through the chamber from one end thereof to the other end, means for supplying wet steam to the treatment chamber at the lower end thereof, means for withdrawing steam from the treatment chamber at the upper end thereof and returning the withdrawn steam through said hollow spaces to the lower end of the treatment chamber, means at the lower end of the treatment chamber for deflecting the returned steam toward the upper end of the treatment chamber, and means forming a bulge on said walls which is vertically curving and extends throughout at least the greater part of the length of said walls.

References Cited in the file of this patent
UNITED STATES PATENTS

| 1,146,589 | Morrison | July 13, 1915 |
| 1,848,596 | Allbright | Mar. 8, 1932 |
| 2,820,246 | Thomas | Jan. 21, 1958 |